United States Patent [19]

Schimmel et al.

[11] Patent Number: 5,124,137

[45] Date of Patent: Jun. 23, 1992

[54] PROCESS FOR THE PREPARATION OF ALKALI METAL PHOSPHATE SOLUTIONS

[75] Inventors: Günther Schimmel, Erftstadt; Thomas Staffel, Hürth; Reinhard Gradl, Erftstadt, all of Fed. Rep. of Germany

[73] Assignee: Hoechst Aktiengesellschaft, Frankfurt am Main, Fed. Rep. of Germany

[21] Appl. No.: 676,862

[22] Filed: Mar. 28, 1991

[30] Foreign Application Priority Data

Apr. 11, 1990 [DE] Fed. Rep. of Germany ....... 4011716

[51] Int. Cl.⁵ .............................................. C01B 25/16
[52] U.S. Cl. .................... 423/319; 423/167; 423/309; 423/313; 423/166; 423/312; 423/321 R; 423/555
[58] Field of Search ............... 423/167, 185, 309, 313, 423/319, 321 R, 179, 555, 166, 193

[56] References Cited

U.S. PATENT DOCUMENTS

| | | | |
|---|---|---|---|
| 2,053,319 | 9/1936 | Block et al. | 423/185 |
| 2,954,275 | 9/1960 | Carothers et al. | 423/185 |
| 3,305,304 | 2/1967 | Peterson | 423/313 |
| 3,493,336 | 2/1970 | Milling | 423/313 |
| 3,764,655 | 11/1973 | Ehlers et al. | 423/309 |
| 4,053,561 | 11/1977 | Irani | 423/313 |
| 4,086,322 | 4/1978 | Drechsel | 423/158 |
| 4,620,966 | 11/1986 | Schimmel et al. | 423/185 |
| 4,777,027 | 11/1988 | Davister et al. | 423/320 |

Primary Examiner—Theodore Morris
Assistant Examiner—Edward Squillante
Attorney, Agent, or Firm—Connolly & Hutz

[57] ABSTRACT

Alkali metal phosphate solutions having a fluorine content of less than 20 ppm, based on $P_2O_5$, are prepared by first digesting crude phosphate using sulfuric acid, and separating the calcium sulfate from the crude phosphoric acid. An alkali metal compound is then added to the crude phosphoric acid, and the precipitated solid is filtered off. The prepurified crude phosphoric acid is neutralized to a pH of at least 7, and the solid produced during this operation is separated off. The resultant alkali metal phosphate solutions having a $P_2O_5$ content of from 10 to 30% by weight are adjusted to a pH of between 4.8 and 6.0 using phosphoric acid. The solutions are heated to from 60° to 120° C., and from 1 to 6% by weight, based on the weight of the solution, of an alkaline earth metal oxygen compound are added to the alkali metal phosphate solutions with stirring. Finally, the precipitated solid is filtered off from the alkali metal phosphate solutions after a residence time of from 0.5 to 4 hours.

8 Claims, No Drawings

PROCESS FOR THE PREPARATION OF ALKALI METAL PHOSPHATE SOLUTIONS

The present invention relates to a process for the preparation of alkali metal phosphate solutions obtained by digesting crude phosphate using sulfuric acid, separating off the calcium sulfate from the crude phosphoric acid, adding an alkali metal compound to the crude phosphoric acid and separating off the solid precipitated thereby, and neutralizing the prepurified crude phosphoric acid to a pH of at least 7 and separating off the solid produced during this operation. These alkali metal phosphate solutions have a fluorine content of less than 20 ppm, based on $P_2O_5$.

In the neutralization of crude phosphoric acid, an alkali metal phosphate solution whose cation contents are sufficiently low is only obtained if the neutralization is carried out to at least pH 7. At lower pH values, the cations are only partially precipitated.

In the process for the purification of alkali metal phosphate solutions of U.S. Pat. No. 2,053,319, aluminum hydroxide suspended in water or an aqueous suspension of aluminum hydroxide and calcium hydroxide is added with stirring to a hot sodium phosphate solution. The mixture is cooled and the solid is separated off, giving a sodium phosphate solution having a low fluorine content.

Finally, U.S. Pat. No. 4,620,966 discloses a process for defluorinating alkali metal phosphate solutions in which wet-process phosphoric acid is first neutralized to a pH above 6 using alkali metal hydroxide solution and the first precipitate formed is filtered off. An alkaline earth metal compound which has a solubility of greater than 0.01 mol of metal ions/l in water at 20° C. is added to the stirred filtrate heated to from 60 to 120° C., and the second precipitate formed is filtered off.

The known processes have the disadvantage of the relatively high fluorine content in the defluorinated alkali metal phosphate solutions, which makes them unsuitable for use in the foodstuffs sector.

It is therefore an object of the present invention to indicate a process for the preparation of alkali metal phosphate solutions which are obtained from wet-process phosphoric acid and whose fluorine content, based on their $P_2O_5$ content, is less than 20 ppm. This is achieved according to the invention by adjusting alkali metal phosphate solutions having a $P_2O_5$ content of from 10 to 30% by weight to a pH of between 4.8 and 6.0 using phosphoric acid; heating the solutions to from 60 to 120° C., preferably from 80 to 100° C., adding from 1 to 6% by weight, based on the weight of the solution, of an alkaline earth metal oxygen compound to the alkali metal phosphate solutions with stirring, and, after a residence time of from 0.5 to 4 hours, separating off the precipitated solid from the alkali metal phosphate solutions.

The process of the invention may optionally have the further features that
a) the alkali metal phosphate solutions are adjusted to a pH of from 5.2 to 5.8 using phosphoric acid;
b) the alkaline earth metal oxygen compound used is calcium nitrate;
c) the alkaline earth metal oxygen compound used is calcium hydroxide;
d) the alkaline earth metal oxygen compound used is calcium oxide; and
e) the alkaline earth metal oxygen compound has a particle size of from 1 to 20 μm.

The alkali metal phosphate solutions obtainable using the process according to the invention are of foodstuffs quality.

In the process of the invention, either so-called thermal phosphoric acid (obtained by pyrolyzing yellow phosphorus to give $P_4O_{10}$ and adsorbing the latter in dilute phosphoric acid) or prepurified so-called wet-process phosphoric acid (obtained by digesting crude phosphate using sulfuric acid and filtering off the calcium sulfate) can be used to adjust the pH of the alkali metal phosphate solutions.

EXAMPLE 1

Comparative Example

A South-African wet-process phosphoric acid (manufacturer: Fedmis) containing 47.8% by weight of $P_2O_5$ was diluted with water to a $P_2O_5$ content of 30% by weight and then neutralized to pH 7 using sodium hydroxide solution. The neutralization precipitate was separated off, giving a sodium phosphate solution containing 18.8% by weight of $P_2O_5$ and 673 ppm of fluorine, based on $P_2O_5$.

The filtrate was heated to 100° C., from 1 to 5% by weight of $Ca(OH)_2$, based on the weight of the filtrate, was added with stirring, and the precipitate which forms was filtered off from the hot mixture after a residence time of 2 hours.

The reduction in the fluorine content is shown in the table below.

| Amount of $Ca(OH)_2$ added [% by weight] | Filtrate $P_2O_5$ [% by weight] | F [ppm/$P_2O_5$] |
| --- | --- | --- |
| 1 | 18.6 | 250 |
| 2 | 18.6 | 92 |
| 3 | 18.6 | 92 |
| 4 | 18.4 | 56 |
| 5 | 17.6 | 23 |

EXAMPLE 2

According to the Invention

Example 1 was repeated with the difference that the sodium phosphate solution was adjusted to pH 6 using thermal phosphoric acid (54.3% by weight of $P_2O_5$) before the addition of the $Ca(OH)_2$. The solution then contained 21.0% by weight of $P_2O_5$ and 553 ppm of F/$P_2O_5$.

The reduction in the fluorine content is shown in the table below.

| Amount of $Ca(OH)_2$ added [% by weight] | Filtrate $P_2O_5$ [% by weight] | F [ppm/$P_2O_5$] |
| --- | --- | --- |
| 1.9 | 20.1 | 19 |
| 2.8 | 20.3 | 11 |
| 3.8 | 19.5 | 12 |
| 4.7 | 18.4 | 8 |

EXAMPLE 3

Comparative Example

A sodium phosphate solution having a pH of 8, prepared from wet-process phosphoric acid obtained from Palaborwa phosphate and containing 18.2% by weight of $P_2O_5$ and 730 ppm of $F/P_2O_5$ was treated at 90° C. with stirring with $Ca(OH)_2$ or $Ca(NO_3)_2$. The precipitate which forms was filtered off from the hot mixture after a residence time of 1.5 hours.

The reduction in the fluorine content is shown in the table below.

| Amount of $Ca(OH)_2$ or $Ca(NO_3)_2$ added [% by weight] | | Filtrate | |
| --- | --- | --- | --- |
| | | $P_2O_5$ [% by weight] | F [ppm/$P_2O_5$] |
| 2 | — | 17.8 | 225 |
| 4 | — | 17.8 | 135 |
| — | 2 | 17.6 | 170 |
| — | 4 | 17.7 | 113 |

EXAMPLE 4

According to the Invention

Example 3 was repeated with the difference that the sodium phosphate solution was adjusted to pH 5.8 using thermal phosphoric acid (54.3% by weight of $P_2O_5$) before the addition of the calcium compound. The solution then contained 23.2% by weight of $P_2O_5$ and 496 ppm of $F/P_2O_5$.

The reduction in the fluorine content is shown in the table below.

| Amount of $Ca(OH)_2$ or $Ca(NO_3)_2$ added [% by weight] | | Filtrate | |
| --- | --- | --- | --- |
| | | $P_2O_5$ [% by weight] | F [ppm/$P_2O_5$] |
| 2 | — | 23.1 | 18 |
| 4 | — | 22.9 | 11 |
| — | 2 | 23.4 | 15 |
| — | 4 | 23.1 | 12 |

EXAMPLE 5

According to the Invention

Example 4 was repeated with the difference that the sodium phosphate solution was adjusted in pH using the wet-process phosphoric acid employed in Example 1. The solution then contained 21.8% by weight of $P_2O_5$ and 780 ppm of $F/P_2O_5$; hydroxides and phosphates of polyvalent metals precipitated therefrom. $Ca(OH)_2$ or $Ca(NO_3)_2$ was added to the suspension at 90° C. with stirring. The precipitate present in the solution was filtered off from the hot mixture after a residence time of 1 hour.

The reduction in the fluorine content is shown in the table below.

| Amount of $Ca(OH)_2$ or $Ca(NO_3)_2$ added [% by weight] | | Filtrate | |
| --- | --- | --- | --- |
| | | $P_2O_5$ [% by weight] | F [ppm/$P_2O_5$] |
| 3 | — | 21.5 | 19 |
| 4 | — | 21.3 | 15 |
| — | 3 | 21.4 | 17 |
| — | 4 | 21.2 | 14 |

We claim:

1. In a process for preparation of an alkali metal phosphate solution from crude wet-processed phosphoric acid and at least one alkali metal compound by processing crude phosphate with sulfuric acid forming crude phosphoric acid, separating resulting calcium sulfate from the crude phosphoric acid, adding an alkali metal compound to the crude phosphoric acid and separating off a precipitated first solid, neutralizing the crude phosphoric acid to a pH of at least 7 with the formation of an alkali metal phosphate solution containing a second solid, and separating off the second solid from the alkali metal phosphate solution, heating the alkali metal phosphate solution to from 60° C. to 120° C., adding to said alkali metal phosphate solution while stirring an alkaline earth metal oxygen compound, and after a residence time of from 0.5 to 4 hours separating off the precipitated third solid from the alkali metal phosphate solution, the improvement which comprises adjusting the alkali metal phosphate solution having a $P_2O_5$ content of from 10 to 30% by weight of a pH of between 4.8 and 6.0 by means of phosphoric acid prior to heating the alkali metal phosphate solution and adding from 1 to 6% by weight, based on the weight of the alkali metal phosphate solution, of the alkaline earth metal oxygen compound with formation of an alkali metal phosphate solution having a fluorine content of less than 20 ppm, based on $P_2O_5$, said alkali metal phosphate solution being of foodstuffs quality.

2. The process as claimed in claim 1, wherein the alkali metal phosphate solution is adjusted to a pH of from 5.2 to 5.8 using phosphoric acid.

3. The process as claimed in claim 1, wherein the alkali metal phosphate solution adjusted in pH using phosphoric acid is heated to from 80 to 100° C.

4. The process as claimed in claim 1, wherein the alkaline earth metal oxygen compound used is calcium nitrate.

5. The process as claimed in claim 1, wherein the alkaline earth metal oxygen compound used is calcium hydroxide.

6. The process as claimed in claim 5, wherein the calcium hydroxide has a particle size of from 1 to 20 μm.

7. The process as claimed in claim 1, wherein the alkaline earth metal oxygen compound used is calcium oxide.

8. The process as claimed in claim 7, wherein the calcium oxide has a particle size of from 1 to 20 μm.

* * * * *